(12) United States Patent
Kim et al.

(10) Patent No.: US 8,318,346 B2
(45) Date of Patent: Nov. 27, 2012

(54) LITHIUM ION BATTERY

(75) Inventors: Joongheon Kim, Yongin-si (KR);
Hyungbok Lee, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 1484 days.

(21) Appl. No.: 11/646,386

(22) Filed: Dec. 28, 2006

(65) Prior Publication Data
US 2007/0154795 A1 Jul. 5, 2007

(30) Foreign Application Priority Data

Dec. 29, 2005 (KR) .............................. 2005-134547

(51) Int. Cl.
*H01M 4/00* (2006.01)
*H01M 4/02* (2006.01)
*H01M 4/13* (2010.01)

(52) U.S. Cl. ...................... 429/211; 429/128
(58) Field of Classification Search .................. 429/162, 429/211, 245, 246, 122, 149, 152, 209, 233, 429/128
See application file for complete search history.

(56) References Cited

U.S. PATENT DOCUMENTS

| 5,556,719 | A | * | 9/1996 | Hong et al. ................. 429/218.2 |
| 6,051,338 | A | * | 4/2000 | Miyazaki et al. ............. 429/211 |
| 6,242,131 | B1 | * | 6/2001 | Noh ............................. 429/185 |
| 6,875,540 | B2 | * | 4/2005 | Nemoto et al. ............. 429/184 |
| 2002/0119367 | A1 | * | 8/2002 | Watanabe et al. ............. 429/129 |
| 2002/0160263 | A1 | * | 10/2002 | Corrigan et al. ............. 429/209 |

FOREIGN PATENT DOCUMENTS

| EP | 0642186 A1 | 3/1995 |
| JP | 6-13065 | 1/1994 |
| JP | 10-172607 | 6/1998 |
| JP | 2002-42855 | 2/2002 |
| KR | 10-2000-0076959 | 12/2000 |

* cited by examiner

*Primary Examiner* — Jennifer Michener
*Assistant Examiner* — Eli Mekhlin
(74) *Attorney, Agent, or Firm* — Knobbe Martens Olson & Bear LLP

(57) ABSTRACT

A lithium ion battery includes an electrode assembly having a first electrode plate folded into a V-shaped sectional surface, a second electrode plate which is inserted into an inner-side surface of the first electrode plate and which has an opposite polarity to the said first electrode plate, and separator which is interposed between the first electrode plate and the second electrode plate, a case to receive the electrode assembly, and a first electrode tab electrically coupled to the first electrode plate and which extends to the exterior of the case, and a second electrode tab electrically coupled to the second electrode plate, and which extends to the exterior of the case.

15 Claims, 6 Drawing Sheets

LITHIUM ION BATTERY

CROSS-REFERENCE TO RELATED APPLICATION

This application claims the benefits of Korean Patent Application No. 2005-134547, filed on Dec. 29, 2005 in the Korean Intellectual Property Office, the disclosure of which is incorporated herein by reference.

BACKGROUND OF THE INVENTION

1. Field of the Invention

Aspects of the present invention relate to a lithium ion battery, and more particularly, a lithium ion battery having an ultra slim and large size electrode plate to form an electrode assembly which does not require piling an electrode plate in layers or winding an electrode plate in layers.

2. Description of the Related Art

Recently, as improvements have been made to make electric instruments and portable wireless products, such as a video camera, a cellular phone, a lap-top computer and a PDA, more lightweight and compatible with each other, it has become increasingly important to develop improved batteries that are used as power supplies for these products. As a result, research about developing these improved batteries is increasing.

Specifically, a lithium ion secondary battery can supply an electric charge and discharge and has a high energy density per unit weight as well as quick charging capability compared to a lead storage battery, a nickel-cadmium battery, a nickel-hydrogen battery and a nickel-zinc battery, because of the light characteristics of the lithium atom. Thus, researchers are actively researching and developing improved lithium ion secondary batteries.

The lithium ion secondary battery uses a non-aqueous electrolyte to prevent an adverse reaction from occurring between the lithium and moisture. The electrolyte may be a solid polymer including a lithium salt, or a liquid dissolved lithium salt derived from an organic solvent. The liquid dissolved lithium salt is usually an ethylene carbonate, a propylene carbonate, a carbonate including a different alkyl group or a similar organic compound. The liquid dissolved lithium salt has a boiling temperature over 50 degrees and very low vapor pressure at room temperature. The lithium ion secondary battery can be divided into various types, including a lithium metal battery, a lithium ion battery which uses a liquid electrolyte, and a lithium ion polymer which uses a polymer solid electrolyte. The lithium ion polymer battery can be classified into various types, including a pure solid type lithium ion polymer battery which does not have an organic electrolyte, and a lithium ion polymer battery which uses a gel typed polymer electrolyte including an organic electrolyte produced by a different kind of a polymer solid electrolyte.

A pure solid type lithium ion polymer battery does not leak an organic electrolyte, but the gel typed lithium ion polymer battery having an organic electrolyte leaks an organic electrolyte. However, compared to the lithium ion battery which uses a liquid electrolyte, the leaking problem of the lithium ion polymer battery can be reduced. For example, a lithium ion polymer battery may include a multilayer film pouch made from metal foil and more than one polymer film covering the foil, instead of the conventional metal can used with a lithium ion battery. When a multilayer film pouch is used, the weight of battery is reduced compared to the weight of the battery which uses the metal can. Normally, aluminum is used as the metal from which the foil in the multilayer film pouch is made. The polymer film formed as an inner layer of a pouch film inner layer can prevent contact between the metal foil and an electrolyte and thus prevent a short circuit from occurring among the positive electrode, negative electrode and electrode tabs.

The conventional film pouch is made according to the following method. The first operation is forming an upper part and a lower part of the pouch by folding the middle part of a rectangular pouch film formed integrally with the lithium ion battery based on the length direction of a side. The next operation is forming a groove to receive a battery cell through a pressing part in the lower part of the pouch film. The next operation is winding the multilayer film which is stacked in the order of a positive electrode plate, a separator, and a negative electrode plate, and then forming an electrode assembly out of jelly roll type. A separator is added to an electrode plate that is disposed on the external side of the electrode assembly to prevent the short circuit of a positive electrode and negative electrode when the electrode assembly of jelly roll type is formed. The next operation is disposing the electrode assembly made out of jelly roll type on the groove of the lower part of the pouch film. The final operation is sealing the edges of three sides by adding heat and pressure, without sealing the one side having the pouch film among the four sides of the lower part of the groove.

However, in the case of the lithium ion secondary battery of the multi stacked type or the multi winding type as described above, the size of a battery capable of development and mass production is limited. Thus, in order to use an oversized battery, a battery pack must be used, which involves connecting plural batteries together in series or in parallel. The battery pack has various problems, including the fact that an additional process is needed to construct the battery pack, the unit cost needed to construct an electric circuit and battery pack increases, and the total volume of the battery increases substantially.

SUMMARY OF THE INVENTION

In order to solve the above-described and/or other problems, aspects of the present invention supply a lithium ion battery having an ultra slim and large size electrode plate to form an electrode assembly, which does not require piling an electrode plate in layers or winding an electrode plate in layers.

In order to accomplish the above and/or other objects and advantages, an embodiment of the present invention includes an electrode assembly having a first electrode plate folded in a V-shape, a second electrode plate inserted into an open part of the first electrode plate and having an opposite polarity to the first electrode plate, and a separator interposed between the first electrode plate and the second electrode plate, a case to contain the electrode assembly, a first electrode tab electrically coupled to the first electrode plate and which extends to an exterior of the case, and a second electrode tab electrically coupled to the second electrode plate and which extends to the exterior of the case. The electrode assembly may be formed as a rectangle having two length parts and two width parts, or as a square having four equal sides. The two length parts or the two width parts may have a width of more than 150 mm. Also, the width parts may be 100 mm and the length parts may be 200 mm.

According to an aspect of the embodiment, both the first electrode tab and the second electrode tab may be formed in one of the width parts or one of the length parts of the electrode assembly if formed as the rectangle, or one of the sides if formed as the square. Additionally, the first electrode tab may be formed in one of the width parts, and the second electrode tab may be formed in one of the length parts.

An aspect of the embodiment further includes a first electrode coating portion coated on two inner-sides of the V-shaped first electrode plate and a second electrode coating portion coated on two sides of the second electrode plate which each face one of the inner sides, wherein a portion of the first electrode plate including a folded region thereof is not coated with the first or the second coating portion.

In order to accomplish the above and/or other objects and advantages, a lithium ion battery according to another embodiment of the present invention includes an electrode assembly having a first electrode plate folded in a V-shape, a second electrode plate folded in a V-shape and having one end of the V-shape inserted into an open part of the V-shaped first electrode plate to stack alternately with the first electrode plate, and a separator interposed between the first electrode plate and the second electrode plate, a case to contain the electrode assembly, a first electrode tab electrically coupled to the first electrode plate and which extends to an exterior of the case, and a second electrode tab electrically coupled to the second electrode plate and which extends to the exterior of the case.

According to an aspect of another embodiment, the electrode assembly may be formed as a rectangle having two length parts and two width parts or a square having four equal sides. Also, both the first electrode tab and the second electrode tab may be formed in one of the width parts or one of the length parts. Also, the first electrode tab may be formed in one of the width parts, and the second electrode tab may be formed in one of the length parts.

An aspect of another embodiment further includes a first electrode coating portion coated on two inner faces of the first electrode plate that is inserted into the open part of the second electrode plate and on an outside face of the first electrode plate that is not formed on an outer periphery of the electrode assembly, and a second electrode coating portion may be formed on two inner faces of the second electrode plate that is inserted into an open part of the first electrode plate and on an outside face of the second electrode plate that is not formed on the outer periphery of the electrode assembly.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
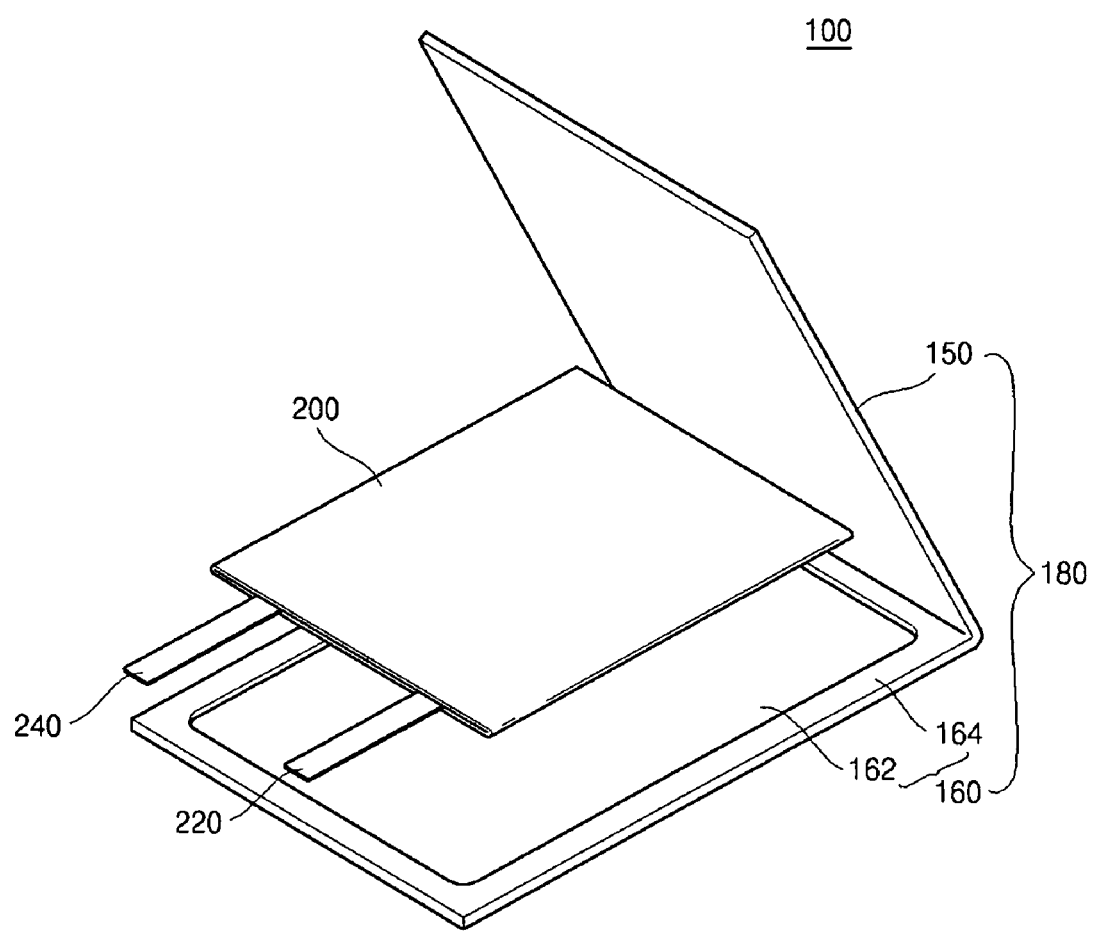
FIG. 1 is an exploded perspective view of the lithium ion battery according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2A:
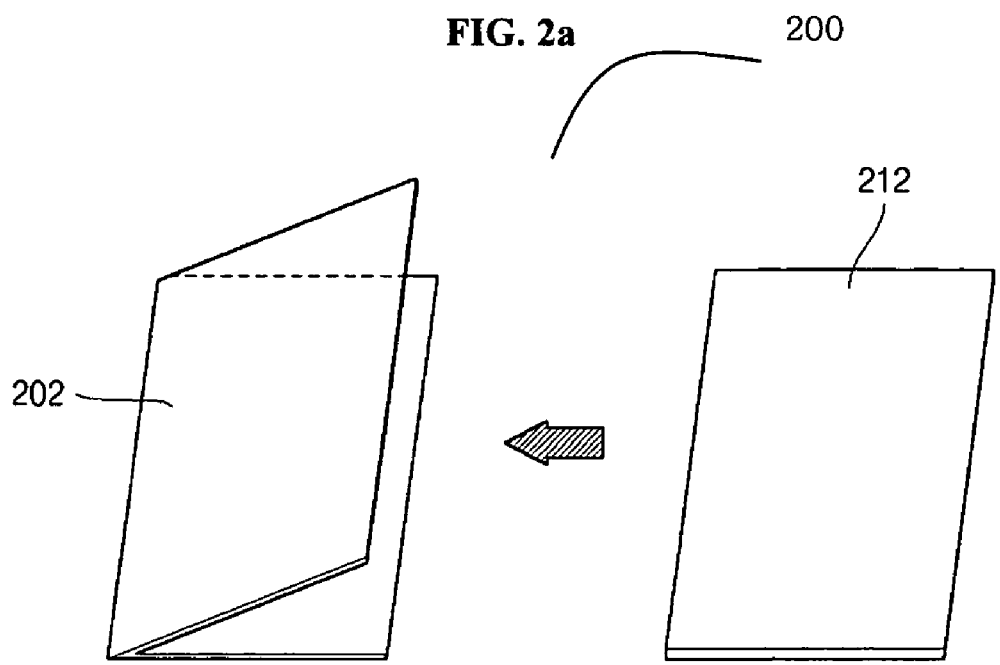
FIG. 2A is an exploded perspective view showing the combination of the first electrode plate and the second electrode plate according to an embodiment of the present invention.
Figure 2B:
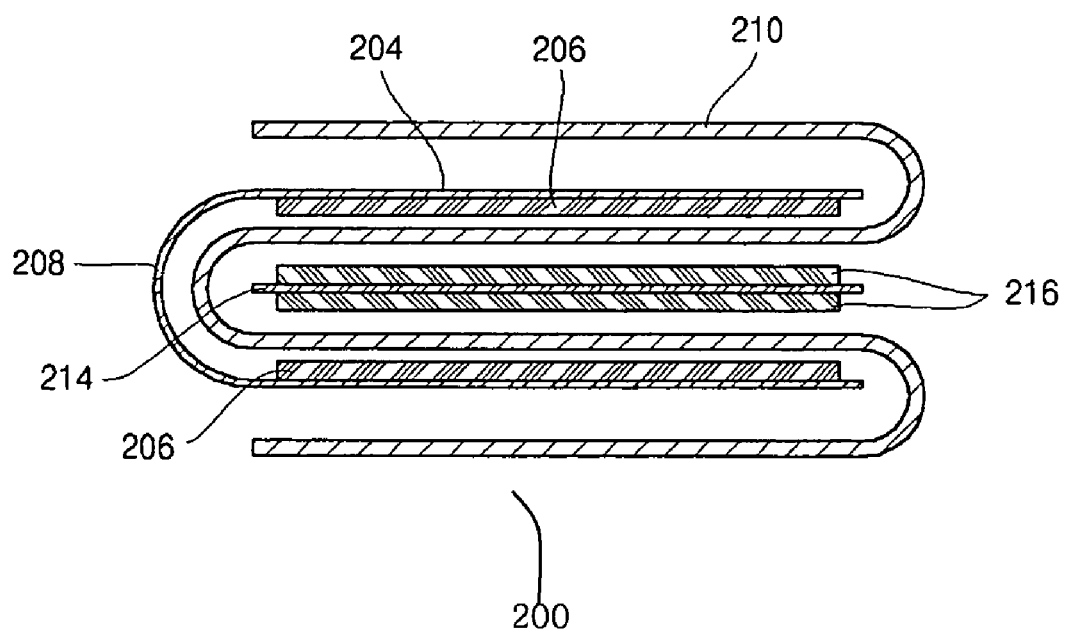
FIG. 2B is a vertical sectional view of the electrode assembly 200 shown in FIG. 2A.

FIG. 1 is an exploded perspective view of the lithium ion battery according to an embodiment of the present invention. FIG. 2A is an exploded perspective view showing the combination of a first electrode plate 202 and a second electrode plate 212 according to an embodiment of the present invention. FIG. 2B is a vertical sectional view of the electrode assembly 200 shown in FIG. 2A.

As illustrated in FIG. 1, the lithium ion battery 100 includes the electrode assembly 200 and the pouch type case 180 that receives the electrode assembly 200. The electrode assembly 200 includes a first electrode tab 220 and a second electrode tab 240. The first electrode tab 220 and the second electrode tab 240 extend to the exterior of the case 180. In the gel type lithium ion battery, the electrolyte is injected into the innerside of the case 180 through an electrolyte injection hole (not shown), and the case 180 is enclosed after injecting the electrolyte. In the case of the pure solid type lithium ion battery, the lithium secondary battery may operate without injecting extra electrolyte because the polymer membrane electrolyte is formed on a separator 210 of a flexible polymer membrane material. This flexible polymer membrane material is preferably, but not necessarily, a polyethylene (PE) material. It is understood that the flexible polymer membrane material may be made out of other materials instead of a PE material.

The case 180 is formed as multilayer film pouch that is made from a metal foil and preferably more than one polymer film covering the metal foil. The case 180 includes a top sheet 150 and a bottom sheet 160 connected to the top sheet 150. The external form of the top sheet 150 and the bottom sheet 160 is formed to correspond to the external form of the electrode assembly 200 to minimize the volume taken up by the lithium ion battery. Although the case 180 is preferably formed as a rectangle or a square, the form of the case 180 is not limited to being a rectangle or a square. The top sheet 150 is folded along an adjacent edge of the bottom sheet 160, so that inner sides of the top sheet 150 and the bottom sheet 160 may be folded to face each other, as shown in FIG. 1. A space 162 to receive the electrode assembly 200 is preferably formed in the bottom case 160 and a sealing part 164 is formed along the edge of the space 162. The sealing part 164 is sealed by heating the edge of the space 162 after the electrode assembly 200 is placed in the space 162.

As illustrated in FIGS. 2A and 2B, the electrode assembly 200 includes a first electrode plate 202, a second electrode plate 212, and a separator 210 arranged between the first electrode plate 202 and the second electrode plate 212. Although the electrode assembly 200 may be formed as a rectangle or a square, the form of the electrode assembly 200 is not limited to being a rectangle or a square. Preferably, the first electrode is an anode, and the second electrode is a cathode. Of course, the first electrode may instead be the cathode and the second electrode may be the anode.

The first electrode plate 202 (hereinafter, the "positive electrode plate") includes the positive electrode collector 204 that is made from the metal plate and the positive electrode coating portion 206 coated to one side of the positive electrode collector 204. The positive electrode collector 204 is preferably formed as an aluminum plate having a good conductivity. The positive electrode coating portion 206 is preferably made from a composition produced by mixing lithium oxide, binder, plasticizer, and a conductive agent. The folded portion of the positive electrode plate 202 is formed with the positive electrode non-coating portion 208 to ensure that the positive electrode coating portion 206 is not formed on the positive electrode collector 204.

The reason that the positive electrode non-coating portion 208 is formed in the folded portion of the positive electrode plate 202 is because the positive electrode coating portion 206 formed in the inner-side of the folded portion may be separated from the positive electrode plate 202 when the positive electrode plate 202 is folded and the folded portion of the positive electrode plate 202 is not faced to a negative electrode coating portion 216. The positive electrode plate 202 is coupled to the positive electrode tab 220. The end and outer portion of the positive electrode tab 220 may be laminated with protective tape.

The second electrode plate 212 (hereinafter, the "negative electrode plate") includes the negative electrode collector 214 that is made of the metal plate and the negative electrode coating portion 216 that is coated to both sides of the negative electrode collector 214. The negative electrode collector 214 is preferably formed as a copper plate having good conductivity. The negative electrode coating portion 216 is made from a negative electrode active material, which is preferably a composition produced by mixing carbon material, binder, plasticizer, and a conductive agent. The negative electrode plate 212 is coupled to the negative electrode tab 240. The end and outer portions of the negative electrode tab 240 may be laminated with protective tape.

The separator 210 is interposed between the positive electrode plate 202 and the negative electrode plate 212. The separator 210 may be extended to wrap around the outer periphery of the electrode assembly 200. The separator 210 prevents short circuits between the positive electrode plate 202 and the negative electrode plate 212. The separator 210 is preferably made from a porous polymer membrane to pass the lithium ion.

As illustrated in FIG. 2A, the positive electrode plate 202 is folded in a V-shape and the negative electrode plate 212 is inserted into the inner-side of the positive electrode plate 202. In other words, the negative electrode plate 212 is inserted into the opened part of the V-shaped positive electrode plate 202. While the positive electrode plate 202 in FIG. 2A is illustrated as being folded into a V-shape, it is understood that the positive electrode plate 202 may be folded into shapes other than a V, as long as the positive electrode plate 202 can receive the negative electrode plate 212 in a recess area. Furthermore, it is understood that the "V-shape" is only an approximation of the shape of the first electrode plate 202, and that on a smaller scale, the "V-shape" resembles more of a "U-shape", as shown in FIG. 2B. The positive electrode coating portion 206 is formed in the part of the positive electrode collector 204 which faces the negative electrode plate 212, that is, in the inner-side of the V-shape of the positive electrode plate 202, and the positive electrode non-coating portion 208 is formed in the remaining part of the positive electrode collector 204. The negative electrode coating portion 216 is formed on both sides of the positive electrode collector 204 which face the positive electrode plate 202.

Figure 3A:
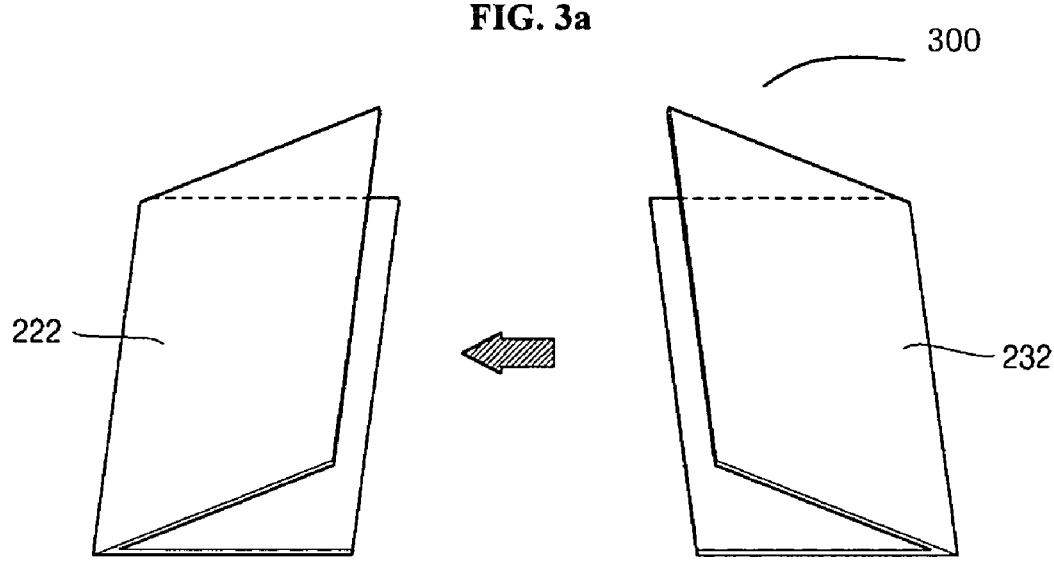
FIG. 3A is an exploded perspective view showing the combination of the first electrode plate and the second electrode plate according to another embodiment of the present invention.
Figure 3B:
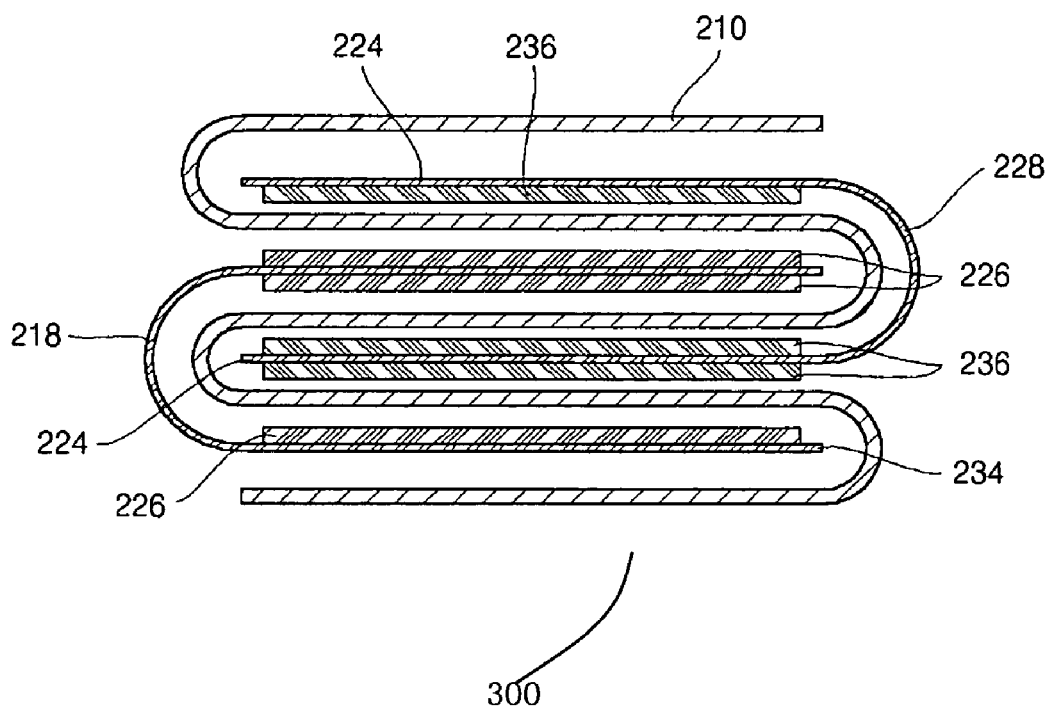
FIG. 3B is a vertical sectional view of the electrode assembly 300 shown in FIG. 3A.

FIG. 3A is an exploded perspective view showing the combination of the first electrode plate and the second electrode plate according to another embodiment of the present invention. FIG. 3B is a vertical sectional view of the electrode assembly 300 shown in FIG. 3A.

As illustrated in FIG. 3A, the positive electrode plate 222 is folded in a V-shape and the negative electrode plate 232 is also folded in a V-shape. While the positive electrode plate 222 and negative electrode plate 232 are illustrated in FIG. 3A as being folded into a V-shape, it is understood that the positive electrode plate 222 and negative electrode plate 232 may be folded into shapes other than a V. Furthermore, it is understood that the "V-shape" is only an approximation of the shape of the positive and negative electrode plates 222 and 232, respectively, and that on a smaller scale, the "V-shape" resembles more of a "U-shape", as shown in FIG. 3B. The open part of the V-shaped positive electrode plate 222 faces the open part of the negative electrode plate 232. The open parts of the positive electrode plate 222 and the negative electrode plate 232 are inserted into each other and stacked in an alternating fashion, as shown in FIG. 3B.

The positive electrode coating portion 226 is formed on the part of the positive electrode collector 234 which faces the two faces of the positive electrode plate 222 that is inserted into the open part of the negative electrode plate 232. A positive electrode non-coating portion 218 is formed on the part of the positive electrode plate 222 which is not inserted into the negative electrode plate 232. The positive electrode coating portion 226 is also formed on the inside face of the positive electrode plate 222, which is not formed on the outer periphery of the electrode assembly 200.

The negative electrode coating portion 236 is formed on the part of the negative electrode collector 224 which faces the two faces of the negative electrode plate 232 that is inserted into the open part of the positive electrode plate 222. A negative electrode non-coating portion 228 is formed on the part of the negative electrode plate 232 which is not inserted into the positive electrode plate 222. The negative electrode coating portion 216 is formed on the outside face of the negative electrode plate 232, which is not formed on the outer periphery of the electrode assembly 200.

By forming the positive electrode plate and the negative electrode plate as described above with reference to FIGS. 2A, 2B, 3A, and 3B, it is possible to make a large-size electrode assembly superior to the conventional winding type and stack type electrode assembly known in the art. For example, the electrode assembly 200 may be formed to have either a length or a width which is more than 150 mm. Alternatively, the electrode assembly 200 may be formed to have a 100 mm width and a 200 mm length. Moreover, according to aspects of the present invention, it may be possible to form an ultra slim electrode assembly having an ideal structure to operate electronic products, such as notebook computers, that require thin batteries.

Figure 4A:
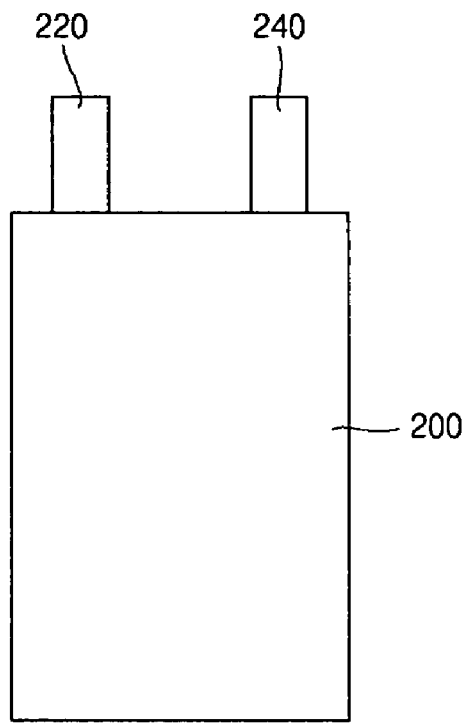
FIGS. 4A, 4B, 4C, 4D and 4E are plan views of the electrode assembly 200 according to an embodiment of the present invention.
Figure 4B:
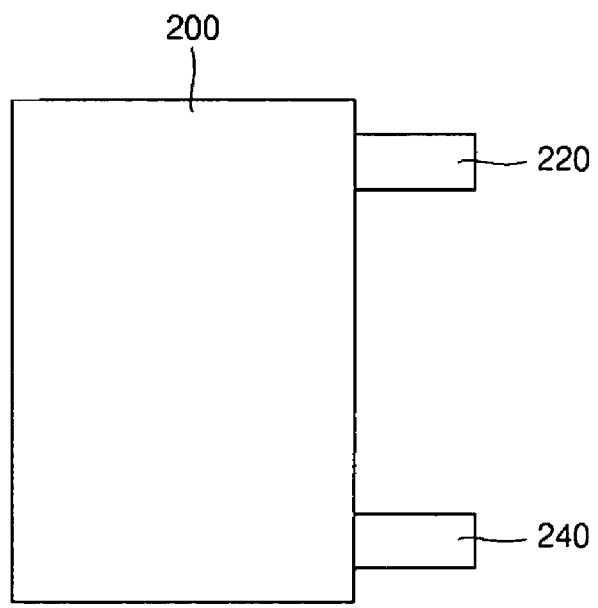
Figure 4C:
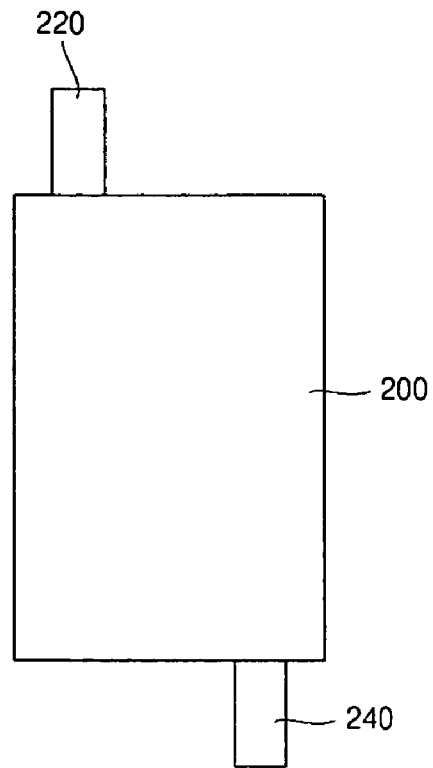
Figure 4D:
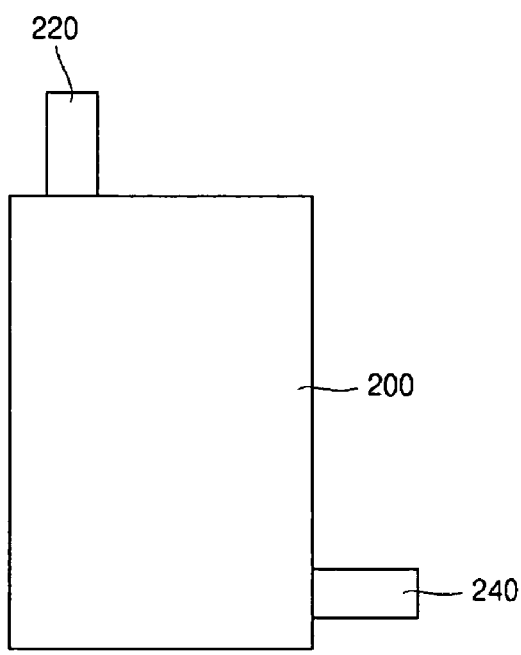
Figure 4E:
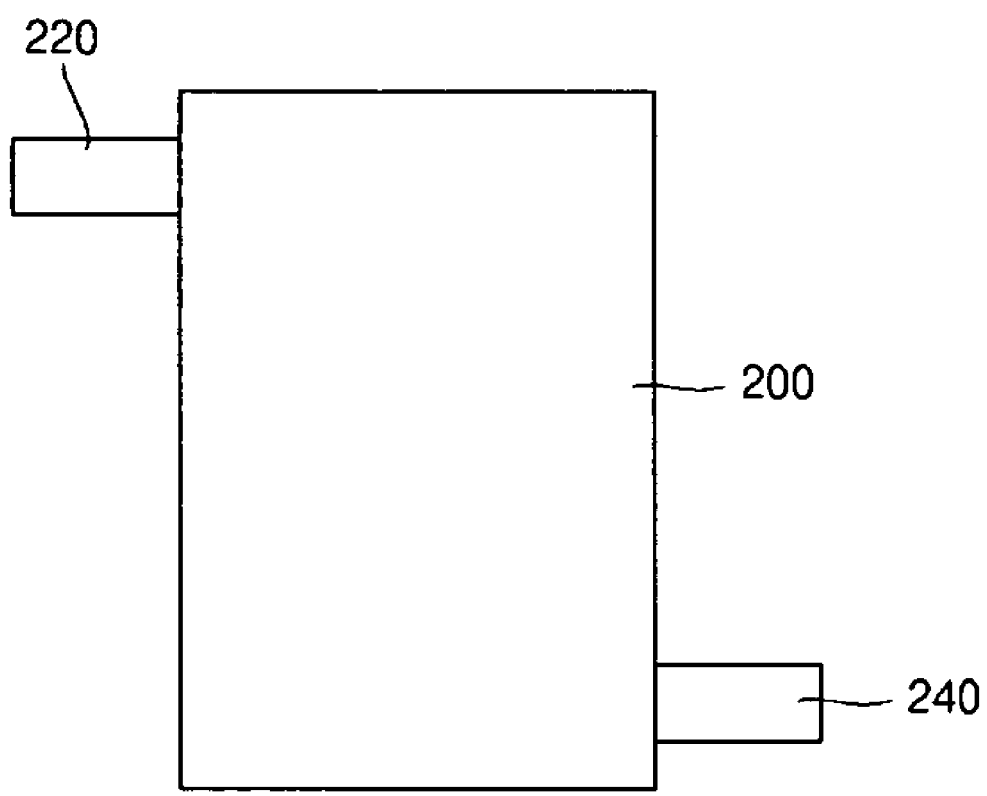

FIGS. 4A, 4B, 4C, 4D and 4E are plan views of the electrode assembly 200 according to an embodiment of the present invention. As illustrated in FIGS. 4A, 4B, 4C, 4D and 4E, both the positive electrode tab 220 and the negative electrode tab 240 may be formed to extend from the width parts or the length parts of the electrode assembly 200 when the electrode assembly is designed in a rectangular form or a square form, as shown in FIGS. 4A and 4B. Alternatively, the positive electrode tab 220 may be formed on one side of the electrode assembly 200, and the negative electrode tab 240 may be formed on another side, as shown in FIGS. 4C, 4D and 4E. Furthermore, it is understood that the positive electrode tab 220 and the negative electrode tab 240 may be formed in any position corresponding to the circuit composition of the electronic products operated by the battery, and that the locations of the positive electrode tab and the negative electrode tab are not limited to the five examples shown in FIGS. 4A, 4B, 4C, 4D and 4E. Additionally, it is understood that the electrode assembly 200 is not limited to being designed in a rectangular or square form, and may instead be designed in other forms, such as a circular or oval form.

The electrode assembly 200 is contained in the bottom case 160 having the space 162. The end parts of the positive electrode tab 220 and the negative electrode tab 240 that are respectively coupled to the positive electrode plate 202 and the negative electrode plate 212 of the electrode assembly 200 are exposed to the exterior of the sealed case 180. The case may be sealed by heating and pressing the sealing part 164, which is located along the edge of the space 162, after placing the electrode assembly 200 in the space 162. The sealing part 164 extends integrally from the case 180 by a prescribed width along to the edge of the space 162.

The lithium ion battery according to aspects of the present invention can solve the problem that the winding type and the stack type electrode assemblies are not able to produce a large battery, can supply power to electronic products that require large amounts of power in a stable fashion without using a battery pack, and can simplify the process and costs of manufacturing by avoiding the use of plural batteries.

Also, while aspects of the present invention provide an ultra slim battery which is required to be used in some electronic devices, such as a notebook computer, the ultra slim battery may also be used with electronic products that use larger batteries to reduce the volume of the battery used with these other products.

As described above, according to aspects of the present invention, since the battery uses a part of the pouch exterior material without using an additional pack case, it is possible to provide a pouch type lithium secondary battery in which the pack is simplified and a method of manufacturing the battery and the pack is also simplified.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A lithium ion battery comprising:
   an electrode assembly including a first electrode plate folded in a V-shape, a second electrode plate inserted into an open part of the first electrode plate and having an opposite polarity to the first electrode plate, and a separator interposed between the first electrode plate and the second electrode plate;
   a case containing the electrode assembly;
   a first electrode tab electrically coupled to the first electrode plate which extends to an exterior of the case;
   a second electrode tab electrically coupled to the second electrode plate which extends to the exterior of the case; and
   first electrode coating portions coated on planar surfaces of the first electrode plate that face the second electrode plate,
   wherein the first electrode plate has uncoated planar surfaces that face away from the second electrode plate.

2. The lithium ion battery as claimed in claim 1, wherein the electrode assembly is formed as a rectangle having two length parts and two width parts, or is formed as a square having four equal sides.

3. The lithium ion battery as claimed in claim 2, wherein the electrode assembly is formed as the rectangle, and the two length parts or the two width parts are more than 150 mm.

4. The lithium ion battery as claimed in claim 2, wherein the electrode assembly is formed as the rectangle, wherein the width parts are 100 mm and the length parts are 200 mm.

5. The lithium ion battery as claimed in claim 2, wherein both the first electrode tab and the second electrode tab are formed in one of the width parts or one of the length parts of the electrode assembly if formed as the rectangle, or one of the sides if formed as the square.

6. The lithium ion battery as claimed in claim 2, wherein the first electrode tab is formed in one of the width parts and the second electrode tab is formed in one of the length parts of the electrode assembly if formed as the rectangle, or the first electrode tab is formed in one of the sides and the second electrode tab is formed in another of the sides of the electrode assembly if formed as the square.

7. The lithium ion battery as claimed in claim 1, further comprising second electrode coating portions coated on planar surfaces of the second electrode plate that face the first electrode plate,
   wherein the first electrode plate has an uncoated folded portion.

8. The lithium ion battery as claimed in claim 1, wherein the first electrode plate comprises an aluminum plate having good conductivity.

9. The lithium ion battery as claimed in claim 1, wherein the second electrode plate comprises a copper plate having good conductivity.

10. A lithium ion battery comprising:
    an electrode assembly including a first electrode plate that is folded in a V-shape, a second electrode plate folded in a V-shape and having one end of the V-shape inserted into an open part of the V-shaped first electrode plate to stack alternately with the first electrode plate, and a separator interposed between the first electrode plate and the second electrode plate;
    a case containing the electrode assembly;
    a first electrode tab electrically coupled to the first electrode plate and which extends to an exterior of the case;
    a second electrode tab electrically coupled to the second electrode plate and which extends to the exterior of the case;
    first electrode coating portions coated on planar surfaces of the first electrode plate that face the second electrode plate; and
    second electrode coating portions coated on planar surfaces of the second electrode plate that face the first electrode plate, wherein,
    the first electrode plate has an uncoated folded portion and an uncoated planar surface that faces away from the second electrode plate, and
    the second electrode plate has an uncoated folded portion and an uncoated planar surface that faces away from the first electrode plate.

11. The lithium ion battery as claimed in claim 10, wherein the electrode assembly is formed as a rectangle having two length parts and two width parts, or is formed as a square having four equal sides.

12. The lithium ion battery as claimed in claim 11, wherein both the first electrode tab and second electrode tab are formed in one of the width parts or one of the length parts of the electrode assembly if formed as the rectangle, or one of the sides if formed as the square.

13. The lithium ion battery as claimed in claim 11, wherein the first electrode tab is formed in one of the width parts of the electrode assembly, and the second electrode tab is formed in one of the length parts of the electrode assembly if formed as the rectangle, or the first electrode tab is formed in one of the sides and the second electrode tab is formed in another of the sides of the electrode assembly if formed as the square.

14. The lithium ion battery as claimed in claim 10, wherein the first electrode plate comprises an aluminum plate having good conductivity.

15. The lithium ion battery as claimed in claim 10, wherein the second electrode plate comprises a copper plate having good conductivity.

* * * * *